United States Patent
Nickel et al.

(10) Patent No.: US 8,492,575 B2
(45) Date of Patent: Jul. 23, 2013

(54) METHOD FOR IMPROVING THE COLOR INDEX OF ORGANOPOLYSILOXANES

(75) Inventors: Friedhelm Nickel, Tübingen (DE); Peter Will, Mössingen (DE)

(73) Assignee: DSM IP Assets B.V., Heerlen (NL)

( * ) Notice: Subject to any disclaimer, the term of this patent is extended or adjusted under 35 U.S.C. 154(b) by 29 days.

(21) Appl. No.: 13/132,136

(22) PCT Filed: Nov. 27, 2009

(86) PCT No.: PCT/EP2009/065970
§ 371 (c)(1),
(2), (4) Date: Aug. 13, 2011

(87) PCT Pub. No.: WO2010/063648
PCT Pub. Date: Jun. 10, 2010

(65) Prior Publication Data
US 2012/0022280 A1    Jan. 26, 2012

(30) Foreign Application Priority Data
Dec. 1, 2008  (EP) ..................... 08170368

(51) Int. Cl.
C07F 7/08  (2006.01)
(52) U.S. Cl.
USPC ...................................... 556/441
(58) Field of Classification Search
None
See application file for complete search history.

(56) References Cited

U.S. PATENT DOCUMENTS

| | | | | |
|---|---|---|---|---|
| 6,114,559 A | * | 9/2000 | Richard et al. | 556/419 |
| 6,123,929 A | * | 9/2000 | Gonzenbach et al. | 424/59 |
| 6,193,959 B1 | * | 2/2001 | Bernasconi et al. | 424/59 |
| 6,344,186 B1 | * | 2/2002 | Hansenne et al. | 424/60 |
| 6,346,595 B1 | * | 2/2002 | O'Lenick, Jr. | 528/29 |
| 6,387,355 B2 | * | 5/2002 | Heidenfelder et al. | 424/59 |
| 6,416,746 B1 | * | 7/2002 | Bringhen et al. | 424/59 |
| 2001/0023293 A1 | * | 9/2001 | Huber | 548/257 |
| 2001/0053856 A1 | * | 12/2001 | Leduc et al. | 548/110 |
| 2006/0160976 A1 | * | 7/2006 | Berg-Schultz et al. | 528/10 |

FOREIGN PATENT DOCUMENTS

| | | |
|---|---|---|
| EP | 0 358 584 | 3/1990 |
| WO | WO 92/20690 | 11/1992 |
| WO | WO 2004/007592 | 1/2004 |
| WO | WO 2006128614 A1 * | 12/2006 |

OTHER PUBLICATIONS

International Search Report for PCT/EP2009/065970, mailed Jan. 14, 2010.
Written Opinion of the International Searching Authority for PCT/EP2009/065970, mailed Jan. 14, 2010.

* cited by examiner

*Primary Examiner* — Robert S Loewe
(74) *Attorney, Agent, or Firm* — Nixon & Vanderhye P.C.

(57) ABSTRACT

The present invention relates to method for improving the color index of an organopolysiloxanes functionalized with a benzalmalonate said method comprising the step of contacting said organopolysiloxanes functionalized with a benzalmalonate with a hydroxy carboxylic acid or a cyclic ester thereof in an organic solvent.

13 Claims, No Drawings

METHOD FOR IMPROVING THE COLOR INDEX OF ORGANOPOLYSILOXANES

This application is the U.S. national phase of International Application No. PCT/EP2009/065970, filed 27 Nov. 2009, which designated the U.S. and claims priority to EP Application No. 08170368.8, filed 1 Dec. 2008, the entire contents of each of which are hereby incorporated by reference.

The present invention relates to method for improving the color index of an organopolysiloxanes functionalized with a benzalmalonate said method comprising the step of contacting said organopolysiloxanes functionalized with a benzalmalonate with a hydroxy carboxylic acid or a cyclic ester thereof in an organic solvent.

UV filter agents with a molecular weight of above 1000 Dalton are highly interesting to the cosmetic industry as due to the high molecular weight they exhibit a negligible systemic exposure due to a lack of transdermal penetration.

Organopolysiloxane functionalized with a benzalmalonate are known as UV-filter agents and are prepared by hydrosilylation, i.e. the addition of Si—H bonds to an unsaturated bond attached to a UV-light absorbing chromophore such as e.g. disclosed in WO92/20690, EP1142930 or EP358584. However, the products resulting from the hydrosilylation process exhibit an unwanted yellow to brownish discoloration, which is not accepted by the cosmetic industry. Even though it is possible to discolor the products by post-treatment with adsorbents such as active charcoal, these processes are tedious, need high amounts of solvents and result in reduced yields.

Thus, there is an ongoing need for a simple, economically attractive and environmentally benign method, which allows the preparation of organopolysiloxanes functionalized with a benzalmalonate with a low color index in good yields by means of a simple industrial process.

Surprisingly, it has been found that hydroxy carboxylic acids or cyclic esters thereof are suitable for improving the color index of an organopolysiloxanes functionalized with a benzalmalonate.

Thus, the invention relates to a method for improving the color index of an organopolysiloxanes functionalized with a benzalmalonate said method comprising the step of contacting said organopolysiloxanes functionalized with a benzalmalonate with a hydroxy carboxylic acid or a cyclic ester thereof in an organic solvent.

The degree of coloration of the organopolysiloxanes functionalized with a benzalmalonate before and after the treatment can be determined by methods known to a person skilled in the art such as e.g. by means of color value systems such as the Gardner Index (yellowness index) or the APHA color index.

The organopolysiloxanes functionalized with a benzalmalonate exhibit in particular a Gardner value of less than 2.9, in particular of less than 2.5, such as in the range of 0.01 to 2 after having been contacted with the hydroxy carboxylic acid or a cyclic ester thereof.

The term organic solvent as used according to the present invention relates to carbon-containing chemicals suitable for dissolving the organopolysiloxanes functionalized with a benzalmalonate which have a low boiling point and evaporate easily or can be removed by distillation, leaving the dissolved substance behind. In particular, the boiling points of the organic solvent are below 300° C., in particular below 200° C., even more particular below 150 such as in particular below 100° C. and can thus removed easily at normal or reduced pressure such as at 20 mbar, 1 mbar or even lower pressures. In particular suitable are linear, branched or cyclic $C_{1-8}$ alcohols such as methanol, ethanol, propanol, isopropanol, butanol, isobutyl alcohol, tert-butyl alcohol, hexanol, cyclohexanol, aromatic hydrocarbons such as benzene, toluene or xylene, linear or cyclic acetales such as 1,3-dioxolane or ethylal as well as mixtures thereof. In particular isopropanol is used.

The ratio of organic solvent to the organopolysiloxanes functionalized with a benzalmalonate is not critical. The organic solvent is used in an amount, which allows the solution of the organopolysiloxanes functionalized with a benzalmalonate. In particular, the ratio of the organic solvent(s) to the organopolysiloxanes functionalized with a benzalmalonate (in wt/wt) is in the range of 10:1 to 1:10, in particular 5:1 to 1:5 such as in the range of 1:1 to 0.5:1.

The term hydroxy carboxylic acid or a cyclic ester thereof used according to the invention encompasses hydroxycarboxylic acids such as glycolic acid or lactic acid, hydroxydicarbonic acids such as tartaric acid or hydroxytricarbonic acids such as citric acid as well as cyclic esters thereof such as ascorbic acid without being limited thereto.

In one subembodiment the hydroxy carboxylic acid or a cyclic ester thereof is always selected from glycolic acid, ascorbic acid and/or citric acid such as in particular citric acid.

The amount of the hydroxy carboxylic acid or a cyclic ester thereof used in the method according to the invention is not critical. Preferably, an amount of 0.05-5 wt.-%, preferably, 0.1-1 wt.-% based on the weight of the organopolysiloxanes functionalized with a benzalmalonate is used.

Particularly good results are obtained if an additional amount of hydrogen peroxide is present as this accelerates the discoloration and thus reduces the cycle times. The amount of hydrogen peroxide can also be easily determined by a person skilled in the art and is in particular selected in the range of 0.03 to 3 wt.-% based on a 35 wt. % aqueous hydrogen peroxide solution based on the weight of the organopolysiloxane functionalized with a benzalmalonate.

The method according to the present invention is preferably carried out at elevated temperatures such as in the range of from 40° C. to 150° C., preferably from 40° C. to 80° C., e.g., at about 60° C., wherein the reaction temperature should however not exceed the boiling point of the solvent(s) used.

After the organopolysiloxane functionalized with a benzalmalonate has been brought into contact with a hydroxy carboxylic acid or a cyclic ester thereof in an organic solvent, optionally in the presence of hydrogen peroxide, the solvent can either be evaporated directly or a subsequent washing step may be included before evaporation of the solvent(s). Such washing steps are well known to a person skilled in the art. In a particular embodiment, a washing step with a mixture of MeOH/water is included. The ratio of MeOH/water is not critical and may range from 20:1 to 5:1 such as e.g. 10:1.

In one subembodiment of the invention, the organopolysiloxanes functionalized with a benzalmalonate according to the invention always comprise at least one unit selected from the formula (Ia), (Ib), (Ic) and/or (Id)

(Ia)

$$R^3COO\text{—}\underset{COOR^3}{\overset{}{C}}\text{=}CH\text{—}\phantom{}\text{—}O\text{—}Y\text{—}\underset{CH_2}{\overset{}{C}}\text{—}Si\underset{a}{\overset{R^1}{|}}\text{—}O_{(3-a)/2}$$

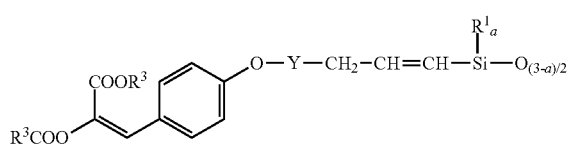

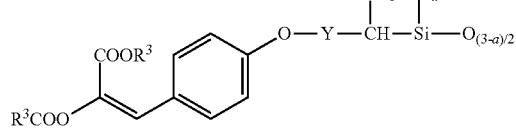

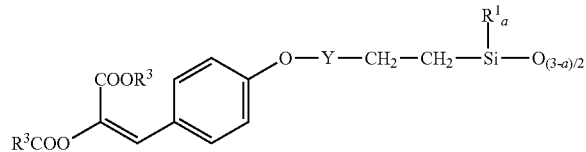

and, optionally, one or several units of formula (II)

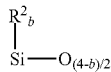

wherein
a is 0, 1 or 2,
b is 0, 1, 2, 3;
$R^1$ is a $C_1$-$C_{30}$ hydrocarbon group or a trimethylsilyloxy group, in particular a $C_1$-$C_{10}$ alkyl group such as a methyl group
$R^2$ is hydrogen, a $C_1$-$C_{30}$ hydrocarbon group or a trimethylsilyloxy group, in particular a $C_1$-$C_{10}$ alkyl group such as a methyl group
$R^3$ is $C_{1-8}$-alkyl group, in particular a $C_{1-4}$-alkyl groups such as an ethyl group
Y is a divalent $C_1$-$C_{10}$ alkylene or $C_2$-$C_{10}$ alkenylene chain, preferably a $C_1$-$C_4$ alkylene chain, most preferably a methylene group.

The organopolysiloxane functionalized with a benzalmalonate according to the invention are polymeric materials which may be homopolymers consisting only of units of formula (Ia), (Ib), (Ic) and/or (Id), or they may be copolymers containing units of formula (Ia), (Ib), (Ic) and/or (Id) as well as units of formula (II). The units of formula (Ia), (Ib), (Ic) and/or (Id) may be distributed randomly in the organopolysiloxane, they may be the end blocking units of the polymer or they may be located at the end of the polymer and pending in a chain of the polymer at the same time.

If a is 2 the two substituents $R^1$ may be identical or different. If b is 2 or 3 the two or three substituents $R^2$ may be identical or different. If the polymer contains more than one unit of formula (Ia), (Ib), (Ic) and/or (Id) the substituents $R^1$ may be identical or different from unit to unit. If the polymer contains more than one unit of formula (II) the substituents $R^2$ may be identical or different from unit to unit.

The organopolysiloxanes functionalized with a benzalmalonate according to the invention may be linear, cyclic, branched or crosslinked. In a particular embodiment the organopolysiloxanes are linear or cyclic organopolysiloxane, characterized in that in the majority of units (Ia), (Ib), (Ic), (Id) and (II) a=1 and b=2. However, if the organopolysiloxane is a linear polymer at least two end blocking units must be present, thus requiring either the presence of two units in which a has a value of 2 or two units in which b is 3. Such organopolysiloxanes generally exhibit a statistical distribution of polymer chain sizes.

In another subembodiment of the invention, the organopolysiloxanes functionalized with a benzalmalonate are linear organopolysiloxanes comprising
one end blocking unit of formula (IIIa) and one end blocking unit of formula (IIIb) [corresponding to units of formula (Ia), (Ib), (Ic) and/or (Id), wherein a=2, respectively (II), wherein b=3]

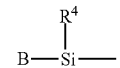

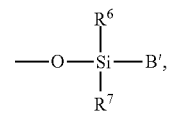

s units selected from the group of (Ia), (Ib), (Ic) and/or (Id) as depicted above wherein a=1 and,
r units of formula (IV) [corresponding to unit of formula (II), wherein b=2]

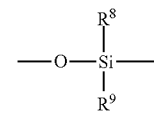

wherein
s is an integer from 0 to 50,
r is an integer from 0 to 200; and
$R^1$, $R^4$, $R^5$, $R^6$, $R^7$ independently are as defined above for $R^1$;
$R^8$ and $R^9$ independently are as defined above for $R^2$
B and B' independently are a group $R^1$ or a benzalmalonate residue selected from

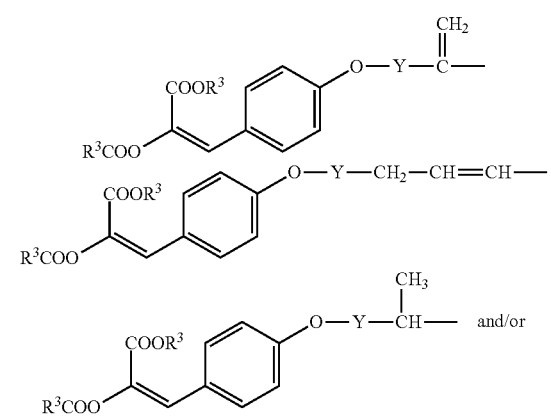

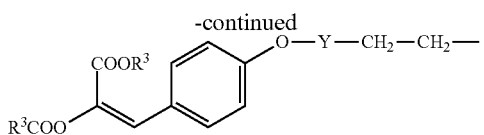

with the proviso that when s is 0 at least B or B' is a benzalmalonate residue.

In a yet other subembodiment, the organopolysiloxanes functionalized with a benzalmalonate are linear organopolysiloxanes consisting of one unit of formula (IIIa) and one unit of formula (IIIb), 4 to 10, preferably 4 to 7 units of formula (Ia) and/or (Ib) and 40 to 90, preferably 60 to 80 units of formula (IV), wherein $R^1$, $R^2$, $R^4$, $R^5$, $R^6$, $R^7$, $R^8$, $R^9$, B and B' are methyl, Y is methylene and $R^3$ is ethyl, and wherein the units of formula (Ia) and/or (Ib) are randomly distributed in the organopolysiloxanes chain. It is well understood to a person skilled in the art that the above description of the organopolysiloxanes refers to an average statistical distribution of polymer chain sizes, which might still contain as minor impurities H-siloxane unit deriving from the preparation process. Most in particular the organopolysiloxane functionalized with a benzalmalonate is polysilicone-15 which is sold as PARSOL® SLX by DSM Nutritional Products Ltd.

Due to the preparation of the organopolysiloxanes functionalized with a benzalmalonate by hydrosilylation, i.e. the addition of a H-siloxane unit of an organopolysiloxane to an unsaturated carbon-carbon bond of a benzalmalonate, normally units of formula (Ia) as well as (Ib), respectively (Ic) as well as (Id) are formed and thus present at the same time in the organopolysiloxanes functionalized with a benzalmalonate. In a particular embodiment the ratio of units of formula (Ia) to units of formula (Ib) in the organopolysiloxanes functionalized with a benzalmalonate is about 4 to 1.

The term $C_1$-$C_{10}$ alkylene used according to the invention includes straight chain or branched saturated hydrocarbon residues such as methylene, 1-ethylene, 2-ethylene, 3-propylene, 2-propylene, 2-methyl-3-propylene, 3-butylene, 4-butylene, 4-pentylene, 5-pentylene, 6-hexylene, and the like.

The term $C_2$-$C_{10}$ alkenylene used according to the invention includes unsaturated hydrocarbon residues containing at least one double bond, such as for example, 2-propen-2-ylene, 2-propen-3-ylene, 3-buten-3-ylene, 3-buten-4-ylene, 4-penten-4-ylene, 4-penten-5-ylene, (3-methyl)-penta-2,4-dien-4 or 5-ylene, 11-dodecen-11-ylene, and the like. The divalent alkylene or alkenylene chains may be interrupted by one or several oxygen atoms.

The term $C_1$-$C_{30}$ hydrocarbon group used according to the invention refers to saturated or unsaturated $C_1$-$C_{30}$ hydrocarbon groups such as $C_1$-$C_{30}$ alkyl such as methyl, ethyl, propyl and butyl; $C_2$-$C_{30}$ alkenyl such as vinyl and allyl; and unsubstituted or substituted aryl such as phenyl, alkaryl and alkoxyphenyl. The hydrocarbon group is unsubstituted or substituted by, e.g. halogen, e.g. a halogenated $C_1$-$C_{18}$ hydrocarbon group. The alkyl and alkenyl groups may be straight chain or branched such as e.g. methyl, ethyl, 3-propyl, 2-propyl, 2-methyl-3-propyl, 3-butyl, 4-butyl, 4-pentyl, 5-pentyl, 6-hexyl, 2-propen-2-yl, 2-propen-3-yl, 3-buten-3-yl, 3-buten-4-yl, 4-penten-4-yl, 4-penten-5-yl, (3-methyl)-penta-2,4-dien-4 or 5-yl, 11-dodecen-11-yl.

The invention is illustrated further by the examples without being limited thereto.

EXAMPLE 1

Discoloration of Polysilicone-15

A mixture of 600 g of a sample of polysilicone-15 prepared according to the process disclosed in EP1142930, Example 1 having a Gardner value of 3.5, 398.5 g isopropanol, 1 g citric acid monohydrate and 0.5 g of hydrogenperoxide (35% aqueous solution) was stirred for 4 to 8 h at 60° C. until a Gardner value of about 2 was obtained. The solvent was evaporated at 75° C. under reduced pressure (250-20 mbar) yielding 600 g of polysilicones-15 with a Gardner value of 1.9.

EXAMPLE 2

Discoloration of Polysilicone-15 with Ascorbic Acid

A mixture of 600 g of a sample of polysilicone-15 prepared according to the process disclosed in EP1142930, Example 1 having a Gardner value of 3.5, 398.5 g isopropanol, 1 g ascorbic acid and 0.5 g of hydrogenperoxide (35% aqueous solution) was stirred for 4 to 8 h at 60° C. until a Gardner value of about 2.2 was obtained. The solvent was evaporated at 75° C. under reduced pressure (250-20 mbar) yielding 600 g of polysilicones-15 with a Gardner value of 2.2.

The invention claimed is:

1. A method for improving the color index of an organopolysiloxane functionalized with a benzalmalonate, wherein the method comprises the steps of:
   (a) treating an organopolysiloxane functionalized with a benzalmalonate by contacting the organopolysiloxane with a hydroxy carboxylic acid or a cyclic ester thereof in an organic solvent, and
   (b) washing the organopolysiloxane treated according to step (a) with a methanol/water mixture.

2. The method according to claim 1, wherein the organopolysiloxane functionalized with a benzalmalonate exhibits a Gardner value of less than 2.9 after having been contacted with the hydroxy carboxylic acid or a cyclic ester thereof.

3. The method according to claim 2, wherein the Gardner value of the organopolysiloxane is less than 2.5.

4. The method according to claim 2, wherein the Gardner value of the organopolysiloxane is in the range of 0.01 to 2.

5. The method according to claim 1, wherein the organic solvent is selected from a $C_{1-8}$ alkylalcohol, an acetate, an aromatic hydrocarbon or mixtures thereof.

6. The method according to claim 1, wherein the organic solvent is isopropanol.

7. The method according to claim 1, wherein the organopolysiloxane functionalized with a benzalmalonate comprises at least one unit selected from the formula (Ia), (Ib), (Ic) and/or (Id)

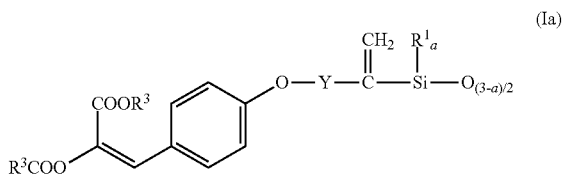

(Ia)

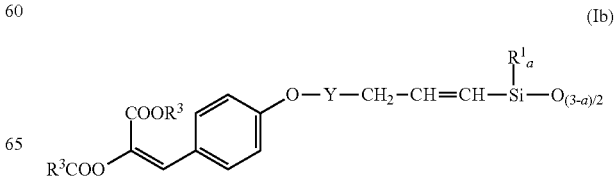

(Ib)

-continued

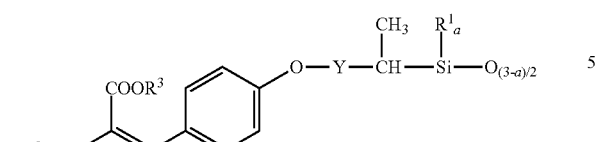
(Ic)

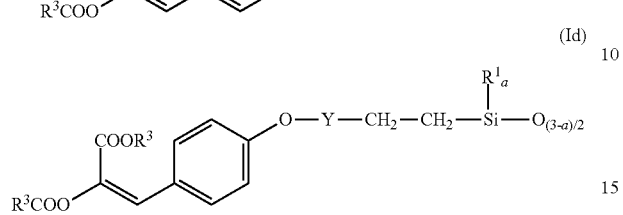
(Id)

and, optionally, one or several units of formula (II)

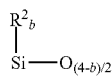
(II)

wherein a is 0, 1 or 2, b is 0, 1, 2, 3;

$R^1$ is a $C_1$-$C_{30}$ hydrocarbon group or a trimethylsilyloxy group and $R^2$ is hydrogen, a $C_1$-$C_{30}$ hydrocarbon group or a trimethylsilyloxy group, $R^3$ is $C_{1-8}$-alkyl, and Y is a divalent $C_1$-$C_{10}$ alkylene or $C_2$-$C_{10}$ alkenylene chain.

8. The method according to claim 7, wherein the organopolysiloxane functionalized with a benzalmalonate is a linear organopolysiloxane comprising:

one end blocking unit of formula (IIIa) and one end blocking unit of formula (IIIb)

(IIIa)

B—Si—
  |
  R⁵
  |
  R⁴

(IIIb)

—O—Si—B',
  |
  R⁷
  |
  R⁶ units selected from the group of (Ia), (Ib), (Ic) and/or (Id) wherein a=1, and, r units of formula (IV)

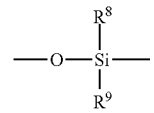
(IV)

wherein s is an integer from 0 to 50, r is an integer from 0 to 200; and $R^1$, $R^4$, $R^5$, $R^6$, $R^7$ independently are as defined above for $R^1$;

$R^8$ and $R^9$ independently are as defined above for $R^2$;

B and B' independently are a group $R^1$ or a benzalmalonate residue selected from

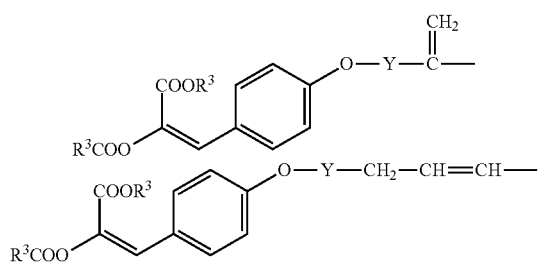

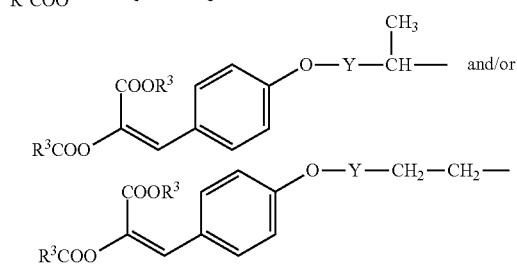

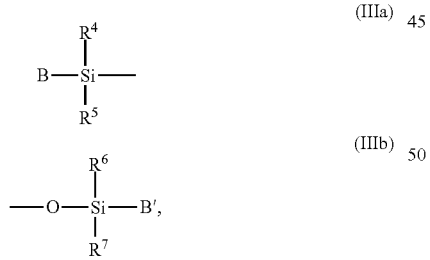

with the proviso that when s is 0 at least B or B' is a benzalmalonate residue.

9. The method according to claim 8, wherein the linear organopolysiloxane functionalized with a benzalmalonate consists of one unit of formula (IIIa) and one unit of formula (IIIb), 4 to 10, units of formula (Ia) and/or (Ib) and 40 to 90 units of formula (IV), wherein $R^1$, $R^2$, $R^4$, $R^5$, $R^6$, $R^7$, $R^9$, B and B' are methyl, Y is methylene and $R^3$ is ethyl, and wherein the units of formula (Ia) and/or (Ib) are randomly distributed in the organopolysiloxanes chain.

10. The method according to claim 9, wherein the linear organopolysiloxane functionalized with a benzalmalonate is polysilicone-15.

11. The method according to claim 9, wherein the linear organopolysiloxane consists of 4 to 7 units of formula (Ia) and/or (Ib) and 60 to 80 units of formula (IV).

12. The method according to claim 7, wherein $R^3$ is a $C_1$-$C_4$ alkyl, and Y a $C_1$-$C_4$ alkylene chain.

13. The method according to claim 12, wherein $R^3$ is ethyl and Y is a methylene group.

* * * * *